United States Patent
Schaeffer et al.

(10) Patent No.: US 9,915,207 B2
(45) Date of Patent: Mar. 13, 2018

(54) IGNITION UNIT FOR TURBOJET ENGINE

(71) Applicant: SNECMA, Paris (FR)

(72) Inventors: Christian Schaeffer, Moissy-Cramayel (FR); David Gino Stifanic, Moissy-Cramayel (FR); Bertrand Boedot, Moissy-Cramayel (FR)

(73) Assignee: SNECMA, Paris (FR)

( * ) Notice: Subject to any disclaimer, the term of this patent is extended or adjusted under 35 U.S.C. 154(b) by 702 days.

(21) Appl. No.: 14/386,656

(22) PCT Filed: Mar. 22, 2013

(86) PCT No.: PCT/EP2013/056119
§ 371 (c)(1),
(2) Date: Sep. 19, 2014

(87) PCT Pub. No.: WO2013/139974
PCT Pub. Date: Sep. 26, 2013

(65) Prior Publication Data
US 2015/0033699 A1    Feb. 5, 2015

(30) Foreign Application Priority Data

Mar. 23, 2012 (FR) ..................... 12 52648

(51) Int. Cl.
*F02C 7/266* (2006.01)
*F02P 15/00* (2006.01)
(Continued)

(52) U.S. Cl.
CPC ............ *F02C 7/266* (2013.01); *F02P 15/003* (2013.01); *F02P 15/02* (2013.01); *F02P 3/0807* (2013.01); *F02P 5/1512* (2013.01)

(58) Field of Classification Search
CPC . F02C 7/264; F02C 7/266; F02P 15/02; F02P 15/003
See application file for complete search history.

(56) References Cited

U.S. PATENT DOCUMENTS 3,678,306 A * 7/1972 Garnier ................. F02C 7/04
                                                    310/11
3,705,775 A * 12/1972 Rioux .................. F01D 5/06
                                                    310/178
(Continued)

FOREIGN PATENT DOCUMENTS

DE  10 2009 048 618    6/2010
EP       2 290 223     3/2011
(Continued)

OTHER PUBLICATIONS

French Preliminary Search Report dated Nov. 26, 2012 in PCT/EP2013/056119 (with English Translation of Category of Cited Documents).
(Continued)

*Primary Examiner* — Craig Kim
(74) *Attorney, Agent, or Firm* — Oblon, McClelland, Maier & Neustadt, L.L.P.

(57) ABSTRACT

An ignition unit for a turbojet engine, including: an electrical power supply, a single control channel to receive a control signal from a computer, a main sparkplug ignition channel to energize at least one main sparkplug of a main combustion chamber, and an afterburner sparkplug ignition channel to energize at least one afterburner sparkplug of an afterburner chamber. The ignition unit is configured, in response to pulsed controls on the single control channel, to selectively activate the main sparkplug ignition channel or the afterburner sparkplug ignition channel.

9 Claims, 4 Drawing Sheets

(51) Int. Cl.
*F02P 15/02* (2006.01)
*F02P 3/08* (2006.01)
*F02P 5/15* (2006.01)

(56) References Cited

U.S. PATENT DOCUMENTS

| | | | |
|---|---|---|---|
| 5,263,318 A | | 11/1993 | Oota et al. |
| 5,301,502 A | | 4/1994 | Oota et al. |
| 5,510,952 A | * | 4/1996 | Bonavia ................ F02P 3/0869 123/596 |
| 5,523,691 A | * | 6/1996 | Frus ........................ F02C 7/266 324/384 |
| 8,434,292 B2 | * | 5/2013 | Eason ..................... F02C 7/266 431/66 |
| 2003/0067284 A1 | * | 4/2003 | Costello .................. F02C 7/266 322/59 |
| 2008/0141651 A1 | | 6/2008 | Eason et al. |

FOREIGN PATENT DOCUMENTS

| | | |
|---|---|---|
| FR | 2 830 691 | 4/2003 |
| FR | 2 958 683 | 10/2011 |
| GB | 1 537 278 | 12/1978 |
| WO | 2008 127467 | 10/2008 |

OTHER PUBLICATIONS

International Search Report dated Aug. 6, 2013 in PCT/EP2013/056119 (with English Translation of Category of Cited Documents).
International Search Report dated Aug. 6, 2013 in PCT/EP13/056119 Filed Mar. 22, 2013.

\* cited by examiner

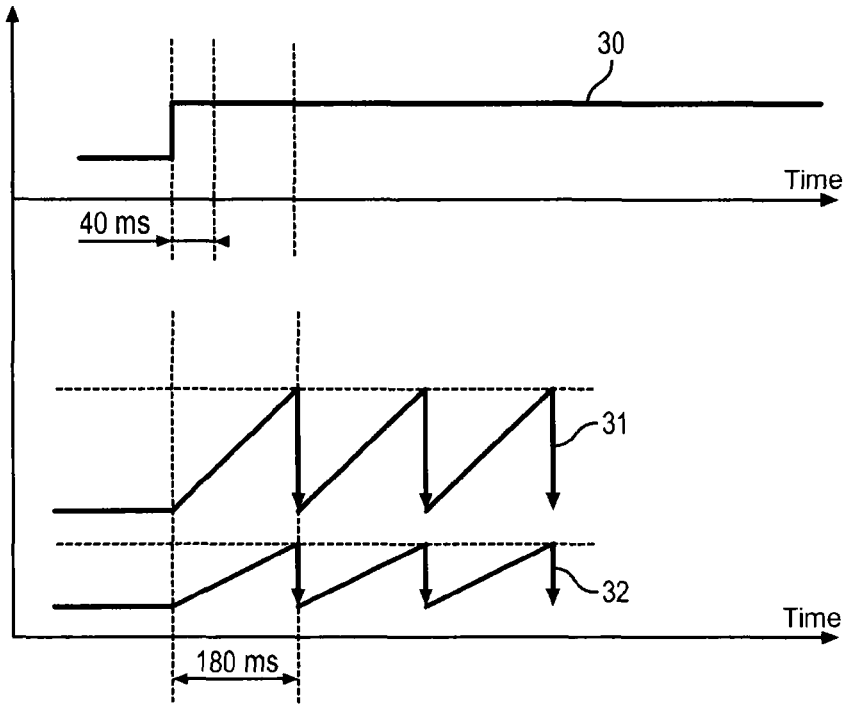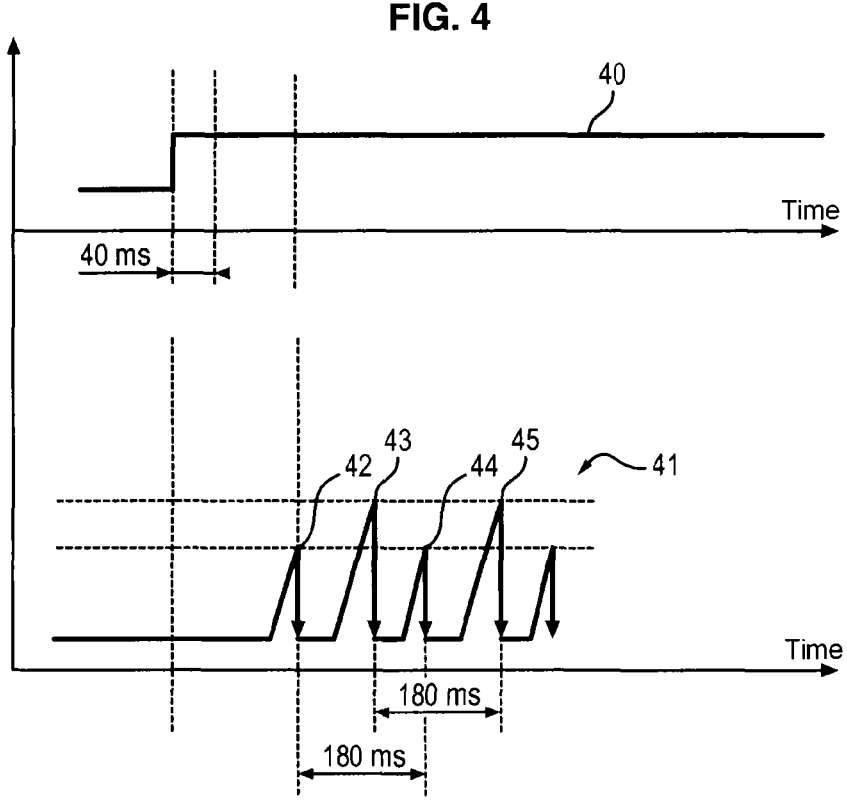

IGNITION UNIT FOR TURBOJET ENGINE

GENERAL TECHNICAL FIELD

The present invention relates to the aeronautical field, and deals more specifically with an ignition unit for a turbojet engine for igniting a main combustion chamber and for igniting afterburning.

BACKGROUND OF THE INVENTION

Turbojet engines for aircraft are currently equipped with an afterburner device. An afterburner device comprises means for injecting fuel in proximity to flame-holder members and at least one afterburning ignition spark plug located in an afterburning ignition area. Under afterburning conditions, additional fuel is injected in order to obtain an increase in thrust.

Such a turbojet engine thus includes two ignition means: main spark plugs for igniting the main combustion chamber, and afterburning spark plugs for igniting afterburning.

For reasons of simplicity, bulkiness and costs, a single ignition unit simultaneously controls the ignition of the main combustion chamber as well as the afterburning ignition. In this way, independently of whether activation of the ignition of the main chamber or the afterburning is desired, the main spark plugs and the afterburning spark plugs are simultaneously energized. The main spark plugs fire even when only the firing of the afterburning spark plugs is desired.

Now, during the operation of the turbojet engine, a main spark plug is subject to very high pressure, of the order of 30 bars, in altitude. Under these conditions, the firing of a main spark plug implies a rapid degradation of the latter. The lifetime of a main spark plug may be considerably reduced by this, causing additional maintenance costs and reducing the availability of the aircraft as well as the reliability of their performances.

It is therefore desirable to only energize a main spark plug when the latter should be sought, i.e. upon starting or restarting the turbojet engine.

Complete segregation between the routes for igniting a main spark plug and the routes for igniting an afterburning spark plug is capable of meeting this requirement, such that the energization of a main spark plug is independent of the energization of an afterburning spark plug.

However, the application of two ignition units, one dedicated to the main plugs and the other to the afterburning spark plugs, represents an overcost, increased bulkiness and a mass increase which may not be acceptable. Further, the requirement of an additional computer output for the independent controls may be incompatible with the existing systems.

Further, replacement of an ignition unit may not be concomitant with a possible adaptation of other elements of the ignition system, and notably with the adaptation of the control signal sent by the computer for controlling the ignition. Thus, it is necessary that the modifications brought to the ignition system may be applied independently of each other.

SUMMARY OF THE INVENTION

The object of the present invention is notably to provide a solution allowing segregation of the energization of the main spark plugs and of the afterburning spark plugs, which is compatible with the existing elements of an ignition system without any increase in mass and in the bulkiness of the ignition system.

For this purpose, according to invention, an ignition unit is proposed for a turbojet engine, said unit comprising:
- an electric power supply,
- a single control channel for receiving a control signal from a computer,
- a channel for igniting a main spark plug in order to energize at least one main spark plug of a main combustion chamber,
- a channel for igniting an afterburning spark plug in order to energize at least one afterburning spark plug of an afterburning chamber,
- said unit being capable, in response to pulsed commands on said single control channel, of selectively activating the main spark plug ignition channel or the afterburning spark plug ignition channel.

The invention is advantageously but optionally completed by the following features, taken alone or in any of their technically possible combination:
- the unit further comprises a control module for decoding the control signal in order to determine which ignition channel has to be activated;
- selective activation of the main spark plug ignition channel or of the afterburning spark plug ignition channel depends on the pulse durations of the control signal;
- the duration of a pulse of the control signal for controlling the activation of an ignition channel depends on the energy required for energizing the spark plug corresponding to said ignition channel;
- the signal has a time-out after each pulse of the control signal, said time-out corresponding to a signal level different from the signal level of the pulse and being followed by a continuous command at a signal level corresponding to the signal level of the pulse;
- the unit comprises an electric power supply channel common to the main spark plug ignition channel and to the afterburning spark plug ignition channel, said common electric power supply channel comprising a single capacitive block intended to be brought to a voltage depending on the ignition channel to be activated;
- each of the ignition channels includes a thyristor connected to the single capacitive block, said thyristor being controlled depending on the state of the common electric power supply channel and of the pulse control;
- the unit is adapted for beginning the charging of the capacitive block as soon as a pulse is detected and before determining the ignition channel to be activated;
- the unit is capable, in response to a control voltage step on said single control channel, of alternately activating the main spark plug ignition channel and the afterburning spark plug ignition channel.

The invention also deals with an ignition system for a turbojet engine, comprising:
- an ignition unit according to the invention,
- a main spark plug of a main combustion chamber which may be energized through the main spark plug ignition channel of said unit,
- an afterburning spark plug which may be energized through the afterburning spark plug ignition channel of said unit,
- a computer connected to the control channel of said unit for sending a control signal to said unit.

SHORT DESCRIPTION OF THE FIGURES

Other features, objects and advantages of the invention will become apparent from the description which follows, which is purely illustrative and non-limiting, and which should be read with reference to the appended drawings wherein, FIG. 1 is a diagram illustrating an ignition unit from the state of the art;

FIG. 3 is a time diagram illustrating the behavior of the ignition unit of the state of the art in response to a control signal of the state of the art;

FIG. 4 is a time diagram illustrating the behavior of the ignition unit according to a possible embodiment of the invention in response to a control signal of the state of the art;

DETAILED DESCRIPTION

Figure 1:
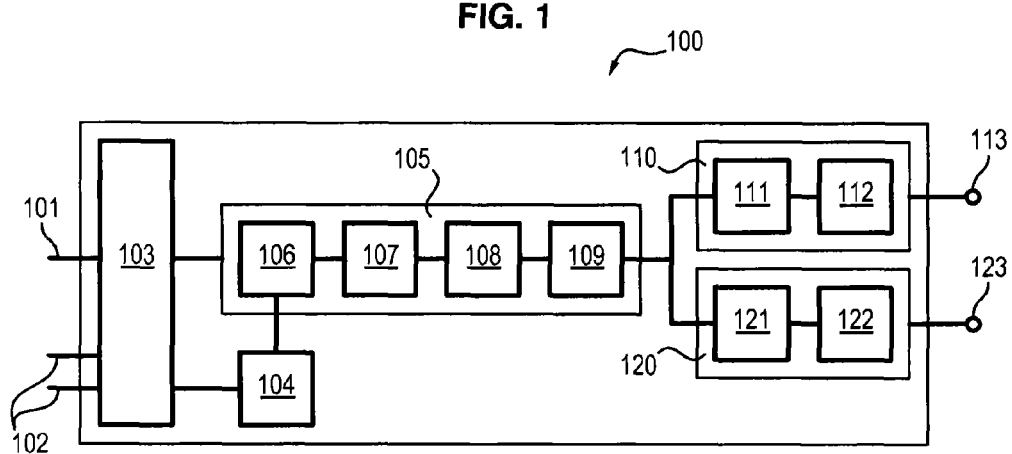

FIG. 1 is a diagram illustrating an ignition unit 100 of the state of the art and showing its most important components. Such an ignition unit 100 has an electric power supply 101 and a single control channel 102 for receiving a control signal from a computer. The control channel 102 is here materialized with two physical lines for producing redundancy improving the reliability of the control of the ignition unit 100.

An electric processing stage 103 applies electric filtering of the power supply and of the control signal, and includes a protective device against overvoltages, in order to protect the unit against possible alterations of these inputs which may damage the ignition unit 100 or deteriorate its operation.

The ignition unit 100 also includes a control module 104 which receives the control signal after that it has passed in transit through the control channel 102 and has been processed by the electric processing stage 103. This control module 104 determines the activation of the channels for igniting spark plugs from the control signal, and controls the electric conversion stage 105 so that the latter converts the received power supply of 28 volts into 2,800 volts.

The electric conversion stage 105 for this purpose includes a switching power supply 106 of the flyback converter type and a transformer 107 for raising the voltage to the intended level. A rectifier 108 then rectifies the current for charging the capacitors 111, 121 of each of the channels 110,120 for igniting spark plugs.

A spark-gap 109 allows discharging of the capacitors 111, 121 when the desired voltage threshold is attained, both at a channel for igniting the main spark plugs 110 and at a channel for igniting the afterburning spark plugs 120. The discharge current of the capacitors 111, 121 is then transmitted to the induction coils of the output stages 112, 122 and causes firing of the ignition spark plugs to which energy is transmitted through means 113, 123 for connections with the latter. The output stage 112, 122 notably allows control of the duration of the spark of the plugs with which it is associated.

FIG. 3 illustrates the charging of the capacitors 111, 121 of the ignition unit 100 of the state of the art in response to a control signal of the state of the art. The upper curve 30 illustrates the time-dependent change in the control signals. The middle curve 31 illustrates the charging energy of the capacitor 111 of the main spark plug ignition channel 110, and the lower curve 32 illustrates the charging energy of the capacitors 121 of the afterburning spark plug ignition channel 120. The scale is arbitrary.

A voltage step or front of the control signal causes activation of the channels for igniting the main spark plugs 110 and of the channels for igniting the afterburning spark plugs 120. As explained earlier, there is no segregation between the ignition spark plugs. The main spark plugs therefore fire at the same time as the afterburning spark plugs, as shown by the simultaneity of the drops in the energy stored by the capacitors 111,121 on the charging energy curves 31, 32 of the latter.

Figure 2:
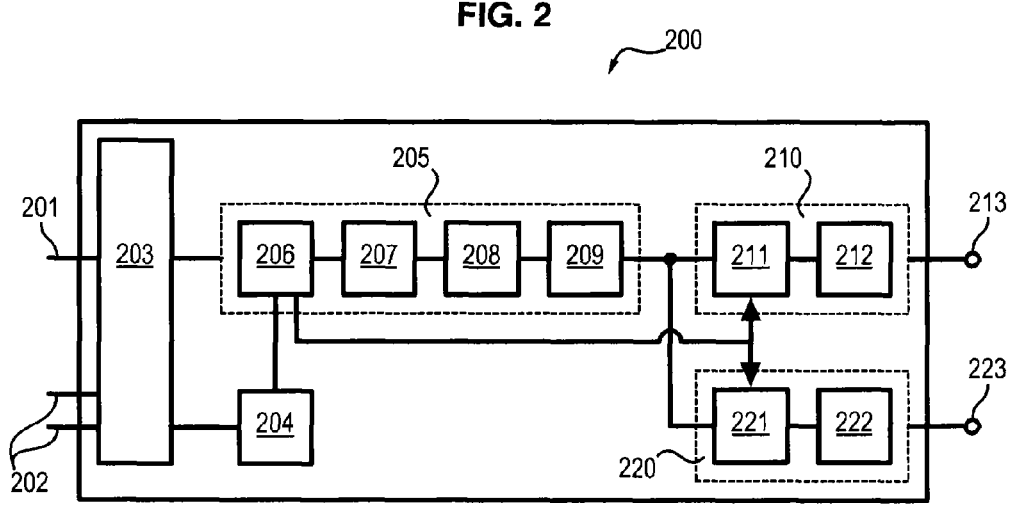
FIG. 2 is a diagram illustrating an ignition unit according to a possible embodiment of the invention.

In order to overcome the drawbacks discussed earlier, according to the invention, an ignition unit for a turbojet engine is proposed, which is capable, in response to pulse commands on a single control channel, of selectively activating the main spark plug ignition channel or the afterburning spark plug ignition channel. FIG. 2 illustrates a possible embodiment of such an ignition unit and the description which follows will be made in reference to this embodiment illustrated by FIG. 2.

The ignition unit 200 has an electric power supply 201 and a single control channel 202 for receiving a control signal from a computer. The control channel 202 is here materialized by two physical lines for producing redundancy improving the reliability of the control of the unit 200.

An electric processing stage 203 applies electric filtering to the power supply and to the control signal, and includes a protective device against overvoltages, in order to protect the unit against possible alteration of these inputs which may damage the ignition unit 200 or deteriorate its operation.

The ignition unit 200 includes a main spark plug ignition channel 210 for energizing at least one main spark plug of a main combustion chamber and a channel for igniting an afterburning spark plug 220 in order to energize at least one afterburning spark plug of an afterburning chamber.

The ignition unit 200 also includes a control module 204 which receives the control signal after it has passed in transit through the control channel 202 and has been processed by the electric processing stage 203. This control module 204 decodes the control signal in order to determine the ignition channel which has to be activated.

The ignition unit 200 also comprises an electric power supply channel 205 common to the main spark plug ignition channel 210 and to the afterburning spark plug ignition channel 220, said common electric power supply channel 205 comprising a single capacitive block 209 intended to be brought to a given voltage depending on the ignition channel to be activated.

Thus, unlike the control unit 100 of the state of the art illustrated by FIG. 1, the control unit 200 according to the possible embodiment of the invention has optimized volume in that it has a single capacitive block 209 for both ignition channels 210, 220, whereas the control unit 100 of the state of the art illustrated by FIG. 1 provides a capacitor for each ignition channel 110, 120.

In order to charge the single capacitive block 209 to a desired voltage, the common electric power supply channel 205 includes a switching power supply module 206 of the flyback converter type and a transformer 207 for raising the voltage. A rectifier 208 then rectifies the current for charging the capacitive block 209.

Each of the ignition channels 210, 220 includes a thyristor 211, 221 connected to the single capacitive block 209, said thyristor 211, 221 being controlled depending on the state of the common electric power supply channel 205 and on the pulse command decoded with the control module 204. The switching power supply module 206 manages the charging of the transformer 207 for switching control to the thyristor 211, 221.

The thyristor 211, 221 of the ignition channel 210, 220 to be activated is made to be conducting when the desired charging energy of the capacitive block 209 is attained. The discharge current of the capacitive block is then transmitted to the induction coils of the output stages 212, 222 and causes firing of the ignition spark plug to which the energy is transmitted through means 213, 223 for connections with the latter.

The ignition unit 200 according to invention thus gives the possibility of having two distinct ignition channels 210, 220 in spite of a single common electric power supply channel 205. It therefore allows an appreciable gain in weight and in volume, as well as in components, having a favorable impact on the unit costs of an ignition unit.

In a preferred embodiment, the selective activation of the main spark plug ignition channel 210 or of the afterburning spark plug ignition channel 220 depends on the durations of the pulses of the control signal.

Figure 5:
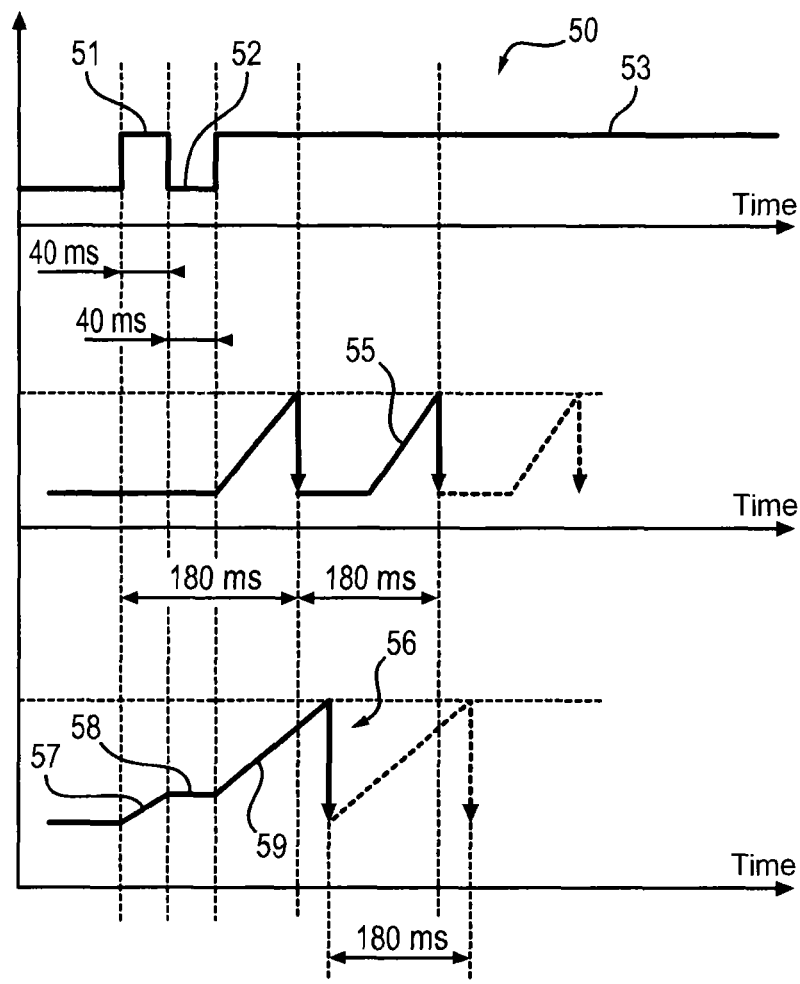
FIG. 5 is a time diagram illustrating the behavior of the ignition unit according to a possible embodiment of the invention and of the ignition unit of the state of the art in response to a control signal according to a possible embodiment of the invention within the scope of the energization of a main spark plug.

FIG. 5 is a time diagram on which is illustrated the time-dependent change 50 of the control signal according to a possible embodiment of the invention within the scope of the energization of a main spark plug.

A main spark plug ignition pulse 51 with a determined duration, for example 40 ms, during which the signal assumes a high level, followed by a time-out 52 of 40 ms during which the signal assumes a low level, tells the control module 204 that it is the main spark plug ignition channel 213 which should be activated in order to energize the main spark plug so that the latter fires.

The middle curve 55 illustrates the charging energy of the capacitive block 209 in response to the control signal illustrated by curve 50. The pulse 51 and the time-out 52 are followed by a continuous control 53 at a signal level corresponding to the pulse signal level 51. The charging of the capacitive block 209 begins with the continuous control 53, after the control module 204 has decoded the control signal.

The response time to the first firing is formed by the duration of the pulse 51 i.e. 40 ms, the duration of the time-out 52, i.e. 40 ms, and the charging time during the application of the continuous control 53. The characteristics of the common electric power supply channel 205 are selected so that the charging time of the capacitive block 209 is reduced relatively to the charging time of the state of the art, so that the response time to the first firing remain substantially the same as in the state of the art, i.e. 180 ms. The response times of the following firings are preferably substantially the same, i.e. 180 ms. The firing sequence of said at least one main spark plug is maintained as long as lasts the continuous control 53.

The lower curve 56 illustrates the charging energy of the capacitor 111 of the main spark plug ignition channel 110 in an ignition unit 100 of the state of the art, in response to the control signal illustrated by curve 50. The charging of the capacitor 111 begins as soon as the pulse 51 occurs since the ignition unit of the state of the art interprets said pulse as the voltage step of the control signal in the state of the art. First charging 57 then begins right from the beginning of the pulse 51, and the charging is then interrupted at a stable level 58 during the time-out 52 before resuming in a second phase 59 when the continuous control 53 is applied. The following firings are similar to those of the state of the art since the then applied continuous control 53 is similar to the voltage step of the control signal of the state of the art.

Thus, the pulse control gives the possibility of controlling the ignition unit 100 of the state of the art within the scope of the energization of the main spark plugs, with simply introduction of the delay, here 40 ms, due to the time-out 52 in the control signal. Consequently, the response time to the first firing is 220 ms while the period of the following firings remains 180 ms during the continuous control 53 since there is then no time-out.

Figure 6:
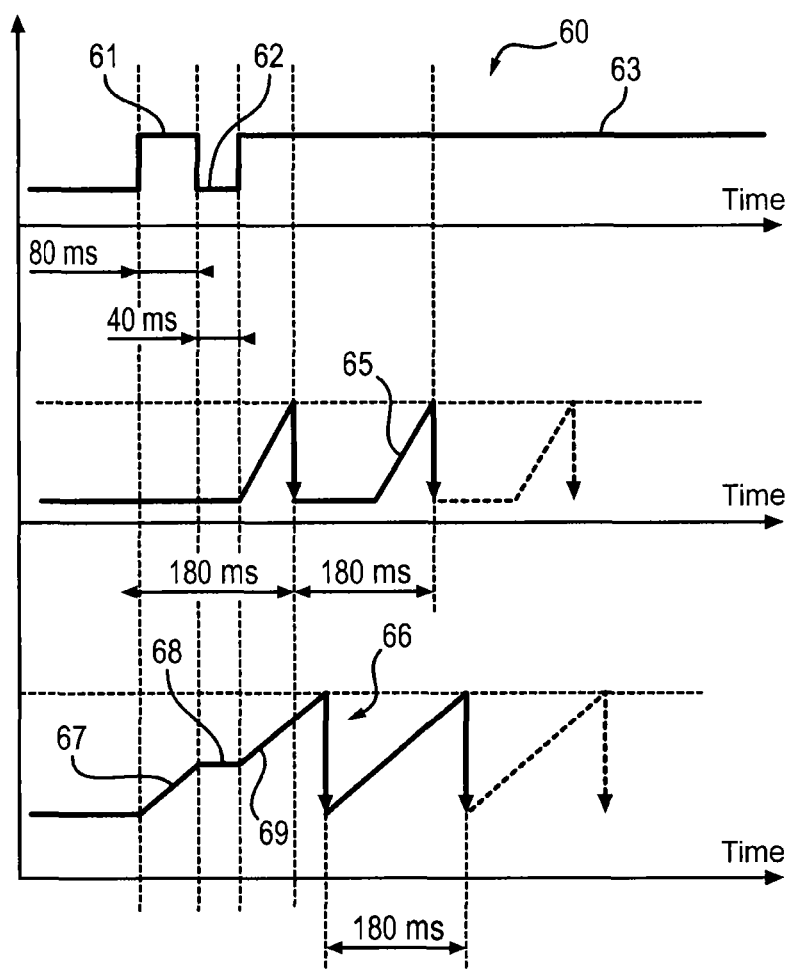
FIG. 6 is a time diagram illustrating the behavior of the ignition unit according to a possible embodiment of the invention and of the ignition unit of the state of the art in response to a control signal according to a possible embodiment of the invention within the scope of the energization of an afterburning spark plug.

FIG. 6 is a time diagram on which is illustrated the time-dependent change 60 of the control signal according to a possible embodiment of the invention within the scope of the energization of an afterburning spark plug.

An afterburning spark plug ignition pulse 61 of a determined duration, in this case 80 ms, during which the signal assumes a high level, followed by a time-out 62 of 40 ms during which the signal assumes a lower level, tells the control module 204 that the afterburning spark plug ignition channel 223 is the one which has to be activated in order to energize the afterburning spark plug so that its firing causes afterburning ignition.

The middle curve 65 illustrates the charging energy of the capacitive block 209 in response to the control signal illustrated by the curve 60. The pulse 61 and time-out 62 are followed by a continuous control 63 at a signal level corresponding to the pulse signal level 61. The charging of the capacitive block 209 begins with the continuous control 63, after the control module 204 has decoded the control signal.

The response time to the first firing of the afterburning spark plug is formed by the duration of the pulse 61, i.e. 80 ms, the duration of the time-out 62, i.e. 40 ms, and the charging time during the application of the continuous control 63. The characteristics of the common electric power supply channel 205 are selected so that the time for charging the capacitive block 209 is reduced relatively to the charging time of the state of the art, so that the response time to the first firing remains substantially the same as in the state of the art i.e. 180 ms. The response time to the following firings are preferably substantially the same, i.e. 180 ms. The firing sequence of said at least one main spark plug is maintained as long as lasts the continuous control 63.

The lower curve 66 illustrates the charging energy of the capacitors 121 of the ignition channel 120 of the afterburning spark plug in an ignition unit 100 of the state of the art, in response to the control signal illustrated by curve 60. The charging of the capacitors 121 begins as soon as the pulse 61 since the ignition unit of the state of the art interprets said pulse as an applied voltage step of the controlled signal in the state of the art. First charging 67 therefore begins from the beginning of the pulse 61, since the charging is interrupted at a stable level 68 during time-out 62 before resuming in a second phase 69 when the continuous control 63 is applied until the firing. The following firings are similar to those of the state of the art since the continuous control 63 which is then applied, is similar to the voltage step of the control signal of the state of the art.

Thus, the pulse control gives the possibility of controlling the ignition unit 100 of the state of the art within the scope of energization of afterburning spark plugs, with simply introduction of a delay of 40 ms due to the time-out 62 of the control signal. Consequently, the response time to the first firing is 220 ms while the period of the following firings remains 180 ms.

The compatibility of the pulsed controls is complete with the existing systems. The result of this is that the control signal may be adapted for having pulsed controls before setting into place an ignition unit 200 according to invention. Further, the pulsed controls do not require any additional control channel and are compatible with the existing computers, as well as with the connections of these computers with the control units.

The pulsed commands have the advantage of being easily identifiable with the ignition unit according to the invention. Also, selecting the ignition by the pulse duration is also easy to process with the ignition unit according to the invention. Indeed, the logic of such a control is simple and does not require any complex detection circuit.

Further, the pulse command may easily be developed for integrating other functionalities. Notably, preheating of the spark plugs may be set into place by means of a dedicated pulse width, with a pulse width corresponding to the preheating of a main spark plug and another width corresponding to the preheating of the afterburning spark plug.

The wear of the spark plugs may also be monitored by injecting different energy levels into the spark plugs. In this case, a specific pulse command is sent to the unit 200 by the control signal in order to inject a corresponding energy level. The determination of the energy level below which said spark plug does not fire, allows determination of the wear of the spark plug, in order to be able to possibly proceed with preventive replacement.

Preferably, the duration of a pulse of the control signal for controlling the activation of an ignition channel depends on the energy required for energization of the correspondent spark plug at said ignition channel. The duration of the pulse of the control signal may thus be selective, all the shorter since the charging energy of the capacitive block 209 required for energization of a spark plug is significant. For example, in the case when the energization of an afterburning spark plug requires 0.5 J and the energization of the main spark plug requires 2.2 J, the duration of a pulse of the control signal for activating the afterburning spark plug ignition channel is greater than the duration of a pulse of the control signal for activating the main spark plug ignition channel. Thus, the charging of the capacitive block 209 starts all the faster since the required energy is high.

The ignition unit 200 according to the invention is compatible with the control signal in the form of a voltage step, of the system of the state of the art. FIG. 4 is a time diagram illustrating the behavior of the ignition unit 200 according to a possible embodiment of the invention in response to a control signal of the state of the art. The control signal has a voltage step 40 for controlling the firing of the main spark plugs and of the afterburning spark plugs. The lower curve 41 illustrates the charging of the capacitive block 209 of the ignition unit 200.

In the presence of a voltage step in the controlled signal, not preceded with a pulse, the ignition channel of the afterburning spark plugs 220 and the ignition channel 210 of the main spark plugs are activated alternately, causing in alternation firing of the afterburning spark plugs and of the main spark plugs, respectively.

However, the presence of a voltage step is only determined after the longest duration of the two pulse durations respectively corresponding to the pulse controlling the activation of the ignition channel of the main spark plugs and of the afterburning spark plugs, by the absence of a falling front and of a time-out which would determine the presence of a pulse. With the exemplified durations, a duration of 120 ms is reached corresponding to the 80 ms pulse followed by the 40 ms time-out controlling the ignition of the afterburning spark plugs.

When the control module 204 is in presence of a voltage step and has determined the absence of pulses at the end of a predetermined duration, the control module determines that the main spark plugs and the afterburning spark plugs should fire alternately.

For this purpose, the charging of the capacitive block 209 has in this case a first charging phase 42 at the end of which firing of the afterburning spark plugs occur, followed by a second charging phase 43 at the end of which firing of the main spark plugs occurs, followed by a third charging phase 44 at the end of which firing of the afterburning spark plugs occurs followed by a fourth charging phase 45 at the end of which firing of the main plugs occurs, etc. The firing alternation of the main spark plugs and of the afterburning spark plugs continues as long as lasts the voltage step of the control signal.

Preferably, the duration between two consecutive firings of a spark plug is the same during the firing sequence, and preferably the same durations separate two consecutive firings of the ignition spark plugs and two consecutive firings of the afterburning spark plugs.

In the example shown, the consecutive firings of the main spark plugs are spaced apart by 180 ms and the consecutive firings of the afterburning spark plugs are also spaced apart by 180 ms.

Thus, the ignition unit according to invention may be controlled by means of a control signal of the state of the art. Therefore, the ignition unit according to the invention may be set into place before adapting the control signal.

The response times of the ignition unit according to the invention may be improved, both in the case of a control signal with pulses and with the control signal of the state of the art only having one voltage step, by beginning the charging of the capacitive block 209 as soon as the control signal passes to a signal level corresponding to a pulse or a voltage step. Indeed, since the capacitive block 209 is unique, the indication by the control signal that ignition is desired necessarily causes the requirement of charging the capacitive block 209, both in the case when the control signal indicates that only one of the ignition channels should be activated and in the case when both ignition channels have to be activated alternately.

Typically, an ignition system for a turbojet engine according to invention will comprise:
- an ignition unit 200 as described above,
- a main spark plug of a main combustion chamber which may be energized through the main spark plug ignition channel 210 of said unit,
- an afterburning spark plug which may be energized through the afterburning spark plug ignition channel 220 of said unit,
- a computer connected to the control channel 202 of said unit for sending a control signal to said unit.

The invention claimed is:
1. An ignition unit for a turbojet engine, comprising:
an electric power supply;
a single control channel for receiving a control signal from a computer, said control signal comprising pulses of different pulse durations;

a main spark plug ignition channel dedicated to at least one main spark plug of a main combustion chamber for energizing said at least one main spark plug;

an afterburning spark plug channel dedicated to at least one afterburning spark plug of a post combustion chamber for energizing said at least one afterburning spark plug; and a control module for decoding the control signal received on the single control channel based on the pulse durations of the pulses of the control signal received on the single control channel, said control signal controlling a selective activation of the main spark plug channel or the afterburning spark plug channel, wherein in response to pulses of the control signal on the single control channel, the control module of the ignition unit is configured to selectively and independently activate the main spark plug channel, or the afterburning spark plug channel, depending on pulse durations of the pulses of the control signal received on the single control channel.

2. The ignition unit for a turbojet engine according to claim 1, wherein the pulse duration of a pulse of the control signal for controlling activation of an ignition channel depends on required energy for energizing the spark plug corresponding to the ignition channel.

3. The ignition unit according to claim 1, wherein the control signal has a time-out after each pulse of the control signal, the time-out corresponding to a signal level different from a signal level of the pulse and being followed by a continuous command at a signal level corresponding to the signal level of the pulse.

4. The ignition unit for a turbojet engine according to claim 1, further comprising an electric power supply channel common to the ignition channel of the main spark plug and to the afterburning spark plug ignition channel, the common electric power supply channel comprising a single capacitive block configured to be brought to a voltage depending on the ignition channel to be activated.

5. The ignition unit for a turbojet engine according to claim 4, wherein each of the ignition channels includes a thyristor connected to the single capacitive block, the thyristor being controlled depending on a state of the common electric power supply channel and on the pulses of the control signal.

6. The ignition unit according to claim 4, configured to begin charging the capacitive block as soon as a pulse has been detected and before determining the ignition channel to be activated.

7. The ignition unit according to claim 1, configured, in response to a control on the single control channel, to alternately activate the main spark plug ignition channel and the afterburning spark plug ignition channel.

8. An ignition system for a turbojet engine, comprising:
an ignition unit comprising:
a single control channel for receiving a control signal from a computer, said control signal comprising pulses of different pulse durations;
a main spark plug ignition channel dedicated to at least one main spark plug of a main combustion chamber for energizing said at least one main spark plug;
an afterburning spark plug channel dedicated to at least one afterburning spark plug of a post combustion chamber for energizing said at least one afterburning spark plug; and
a control module for decoding the control signal received on the single control channel based on the pulse durations of the pulses of the control signal received on the single control channel, said control signal controlling a selective activation of the main spark plug channel or the afterburning spark plug channel,
wherein in response to pulses of the control signal on the single control channel, the control module of the ignition unit is configured to selectively and independently activate the main spark plug channel, or the afterburning spark plug channel, depending on the pulse durations of the pulses of the control signal received on the single control channel;
a main spark plug of a main combustion chamber which may be energized through the main spark plug ignition channel of the ignition unit;
an afterburning spark plug which may be energized through the afterburning spark plug ignition channel of the ignition unit, and
the computer connected to the single control channel of the ignition unit for sending a control signal to the ignition unit.

9. A method of operating an ignition system for a turbojet engine, the ignition system comprising:
an ignition unit comprising:
a single control channel for receiving a control signal from a computer, said control signal comprising pulses of different pulse durations;
a main spark plug ignition channel dedicated to at least one main spark plug of a main combustion chamber for energizing said at least one main spark plug;
an afterburning spark plug channel dedicated to at least one afterburning spark plug of a post combustion chamber for energizing said at least one afterburning spark plug; and
a control module for decoding the control signal received on the single control channel based on the pulse durations of the pulses of the control signal received on the single control channel, said control signal controlling a selective activation of the main spark plug channel or the afterburning spark plug channel,
wherein in response to pulses of the control signal on the single control channel, the control module of the ignition unit is configured to selectively and independently activate the main spark plug channel, or the afterburning spark plug channel, depending on the pulse durations of the pulses of the control signal received on the single control channel;
a main spark plug of a main combustion chamber which may be energized through the main spark plug ignition channel of the ignition unit;
an afterburning spark plug which may be energized through the afterburning spark plug ignition channel of the ignition unit; and
the computer connected to the single control channel of the ignition unit for sending a control signal to the ignition unit, the method comprising:
decoding, using the control module, the control signal received on the single control channel based on the pulse durations of the pulses of the control signal received on the single control channel, and in response to pulsed controls on said single control channel; and
selectively and independently activating the main spark plug channel, or the afterburning spark plug channel, depending on the pulse durations of the pulses of the control signal received on the single control channel.

* * * * *